(12) United States Patent
Givol et al.

(10) Patent No.: US 10,909,536 B2
(45) Date of Patent: Feb. 2, 2021

(54) PROCESSING MESSAGES FOR ATTRIBUTE-VALUE PAIR EXTRACTION

(71) Applicant: Capital One Services, LLC, McLean, VA (US)

(72) Inventors: Dan Givol, Arlington, VA (US); Victor Mayaki, Aldie, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 190 days.

(21) Appl. No.: 16/131,597

(22) Filed: Sep. 14, 2018

(65) Prior Publication Data

US 2019/0188713 A1    Jun. 20, 2019

Related U.S. Application Data

(63) Continuation of application No. 15/849,215, filed on Dec. 20, 2017, now Pat. No. 10,083,441.

(51) Int. Cl.
| | |
|---|---|
| *G06Q 20/40* | (2012.01) |
| *G06Q 20/38* | (2012.01) |
| *H04L 29/06* | (2006.01) |
| *G06F 21/31* | (2013.01) |
| *H04W 4/02* | (2018.01) |
| *H04W 12/06* | (2009.01) |

(Continued)

(52) U.S. Cl.
CPC .......... *G06Q 20/401* (2013.01); *G06F 21/31* (2013.01); *G06Q 20/02* (2013.01); *G06Q 20/388* (2013.01); *H04L 63/0428* (2013.01); *H04L 63/08* (2013.01); *H04L 63/0876* (2013.01); *H04W 4/023* (2013.01); *H04W 12/0013* (2019.01); *H04W 12/06* (2013.01); *H04L 9/321* (2013.01)

(58) Field of Classification Search
CPC .................................................. G06Q 20/401
See application file for complete search history.

(56) References Cited

U.S. PATENT DOCUMENTS

| 5,970,469 A | 10/1999 | Scroggie et al. |
| 7,856,360 B2 | 12/2010 | Kramer et al. |

(Continued)

OTHER PUBLICATIONS

AwardWallet, "Award Wallet Keeps Track of Your Reward Programs" https://awardwallet.com/en/, Apr. 12, 2011, 3 pages.

*Primary Examiner* — Scott C Anderson
(74) *Attorney, Agent, or Firm* — Harrity & Harrity, LLP (57) ABSTRACT

A device may process a message associated with an account to identify a first identifier that identifies a third party. The device may identify a match between the first identifier and transaction information related to an individual associated with the account. The transaction information may include a set of first identifiers that identify a respective set of third parties. The transaction information may facilitate identification of one or more messages that is likely to include account information. The device may tag the message with a second identifier based on the match. The device may receive, from another device, the message based on the message being tagged with the second identifier. The device may process the message to identify the account information related to another account. The device may extract identified account information from the message. The device may perform an action related to extracted account information or the message.

20 Claims, 7 Drawing Sheets

(51) Int. Cl.
*G06Q 20/02* (2012.01)
*H04W 12/00* (2009.01)
*H04L 9/32* (2006.01)

(56) References Cited

U.S. PATENT DOCUMENTS

| | | |
|---|---|---|
| 10,083,441 B1 | 9/2018 | Givol et al. |
| 2006/0229946 A1 | 10/2006 | Scroggie et al. |
| 2009/0171778 A1 | 7/2009 | Powell et al. |
| 2011/0145046 A1 | 6/2011 | Lopez et al. |
| 2012/0150611 A1 | 6/2012 | Isaacson et al. |
| 2013/0246272 A1* | 9/2013 | Kirsch ............... G06Q 20/401 705/44 |
| 2013/0346170 A1 | 12/2013 | Epstein et al. |
| 2015/0019714 A1* | 1/2015 | Shaashua ........... H04L 12/2818 709/224 |
| 2015/0379547 A1 | 12/2015 | Gautam et al. |
| 2016/0086222 A1 | 3/2016 | Kurapati |
| 2018/0336612 A1* | 11/2018 | Bullard, III ........ G06Q 30/0617 |

\* cited by examiner

PROCESSING MESSAGES FOR ATTRIBUTE-VALUE PAIR EXTRACTION

RELATED APPLICATION

This application is a continuation of U.S. patent application Ser. No. 15/849,215, filed Dec. 20, 2017 (now U.S. Pat. No. 10,083,441), which is incorporated herein by reference.

BACKGROUND

A loyalty program is a marketing program designed to encourage customers to continue to transact with an organization associated with the loyalty program. Customers who participate in a loyalty program may be associated with a loyalty account, and may be offered an allotment of loyalty points, associated with the loyalty account, that the customers can apply to future transactions.

SUMMARY

According to some possible implementations, a device may comprise one or more memories; and one or more processors, communicatively coupled to the one or more memories, configured to process a message associated with an account to identify a first identifier that identifies a third party with which the message is associated. The one or more processors may be configured to identify a match between the first identifier and transaction information related to an individual associated with the account. The transaction information may include a set of first identifiers that identify a respective set of third parties related to a set of transactions associated with the individual. The transaction information may facilitate identification of one or more messages that is likely to include account information. The one or more processors may be configured to tag the message with a second identifier based on the match between the first identifier and at least one first identifier of the set of first identifiers included in the transaction information. The second identifier may identify the message as being associated with a third party of the respective set of third parties related to the set of transactions associated with the individual.

The one or more processors may be configured to receive, from another device, the message based on the message being tagged with the second identifier. The other device may be associated with the account. The one or more processors may be configured to process the message to identify the account information related to another account associated with the third party. The one or more processors may be configured to extract identified account information from the message after processing the message to identify the account information. The one or more processors may be configured to perform an action related to extracted account information or the message after extracting the identified account information from the message.

According to some possible implementations, a non-transitory computer-readable medium may store one or more instructions that, when executed by one or more processors, cause the one or more processors to process a message associated with an electronic messaging account of an individual to identify a first identifier that identifies a third party with which the message is associated. The first identifier may include a domain name of the third party, or a text name of the third party. The one or more instructions, when executed by the one or more processors, may cause the one or more processors to identify a match between the first identifier and a set of first identifiers related to a set of third parties with which a set of transactions is associated. The set of transactions may be associated with the individual associated with the electronic messaging account.

The one or more instructions, when executed by the one or more processors, may cause the one or more processors to tag the message with a second identifier based on the match between the first identifier and the set of first identifiers. The second identifier may identify the message as being associated with the set of third parties related to the set of transactions associated with the individual. The one or more instructions, when executed by the one or more processors, may cause the one or more processors to receive, from another device associated with the electronic messaging account, the message based on the message being tagged with the second identifier. The one or more instructions, when executed by the one or more processors, may cause the one or more processors to process the message to identify account information related to a user account associated with the third party.

The one or more instructions, when executed by the one or more processors, may cause the one or more processors to extract the account information from the message after processing the message to identify the account information. The one or more instructions, when executed by the one or more processors, may cause the one or more processors to store the account information after extracting the account information from the message. The one or more instructions, when executed by the one or more processors, may cause the one or more processors to perform an action related to the account information or the message after storing the account information.

According to some possible implementations, a method may comprise receiving, by a device, access information related to an account. The access information may provide the device with access to a set of messages associated with the account. The method may comprise processing, by the device, the set of messages associated with the account based on receiving the access information. The method may comprise identifying, by the device and based on processing the set of messages, particular information in one or more messages of the set of messages. The particular information may include at least one of domain information for a third party, or information that identifies the third party. The method may comprise identifying, by the device, a match between the particular information and transaction information associated with the account. The transaction information may include the particular information associated with a set of third parties related to a set of transactions associated with the account.

The method may include tagging, by the device and to form tagged messages, a subset of the one or more messages with a first identifier based on the match between the particular information associated with the third party and the particular information associated with the set of third parties included in the transaction information. The first identifier may identify the tagged messages as being associated with the set of third parties related to the set of transactions associated with the account. The method may comprise identifying, by the device, a subset of tagged messages that include a first attribute-value pair or a second attribute-value pair. The method may comprise storing, by the device, the subset of tagged messages in a data structure. The method may comprise receiving, by the device and from a user device, a request for account information relating to another account associated with the third party. The method may comprise providing, by the device and for display via the user device, the account information relating to the third party. The account information relating to the third party may include at least one of: the first attribute-value pair, or the second attribute-value pair.

DETAILED DESCRIPTION

The following detailed description of example implementations refers to the accompanying drawings. The same reference numbers in different drawings may identify the same or similar elements.

An individual may sign up for a loyalty or rewards program for an organization (e.g., a retailer, a club, etc.). When the individual signs up for the loyalty or rewards program, account information (e.g., a username, an account balance, etc.) for the loyalty or rewards program may be provided to the individual via a message. For example, the individual may not be provided with a physical card that includes the individual's account information and/or that can be used when completing a transaction to receive loyalty or rewards points. Rather, the individual may have to save the account information separately (e.g., as an archived or downloaded message), may have to write the account information on a piece of paper or on a note application on a user device, may have to search through an inbox of messages to locate the account information, and/or the like, to have access to the account information when the user wants to use the account information when completing a transaction. This consumes time of the individual, consumes processing resources of a device that accesses or stores an inbox of messages (e.g., via the individual searching the inbox), and/or results in unclaimed loyalty and/or rewards points for the individual (e.g., by the individual forgetting to use the account information when completing a transaction).

Some implementations, described herein, provide an account identification platform that is capable of processing messages in an inbox to identify accounts for various loyalty and/or rewards programs and corresponding account information for the accounts. In addition, the account identification platform may populate a virtual wallet with the account information for the accounts after extracting the account information from the messages. This facilitates easier and/or more frequent use of the accounts, thereby increasing a quantity of points or an amount of value received by the individual. In addition, this reduces or eliminates lost value to an individual through unclaimed and/or unused loyalty and/or rewards points. Further, this conserves processing resources that would otherwise be consumed by an individual searching an inbox for a message that includes account information. Further, this improves an efficiency of storing account information and/or using the account information by populating an electronic wallet with extracted account information.

Figure 1A:
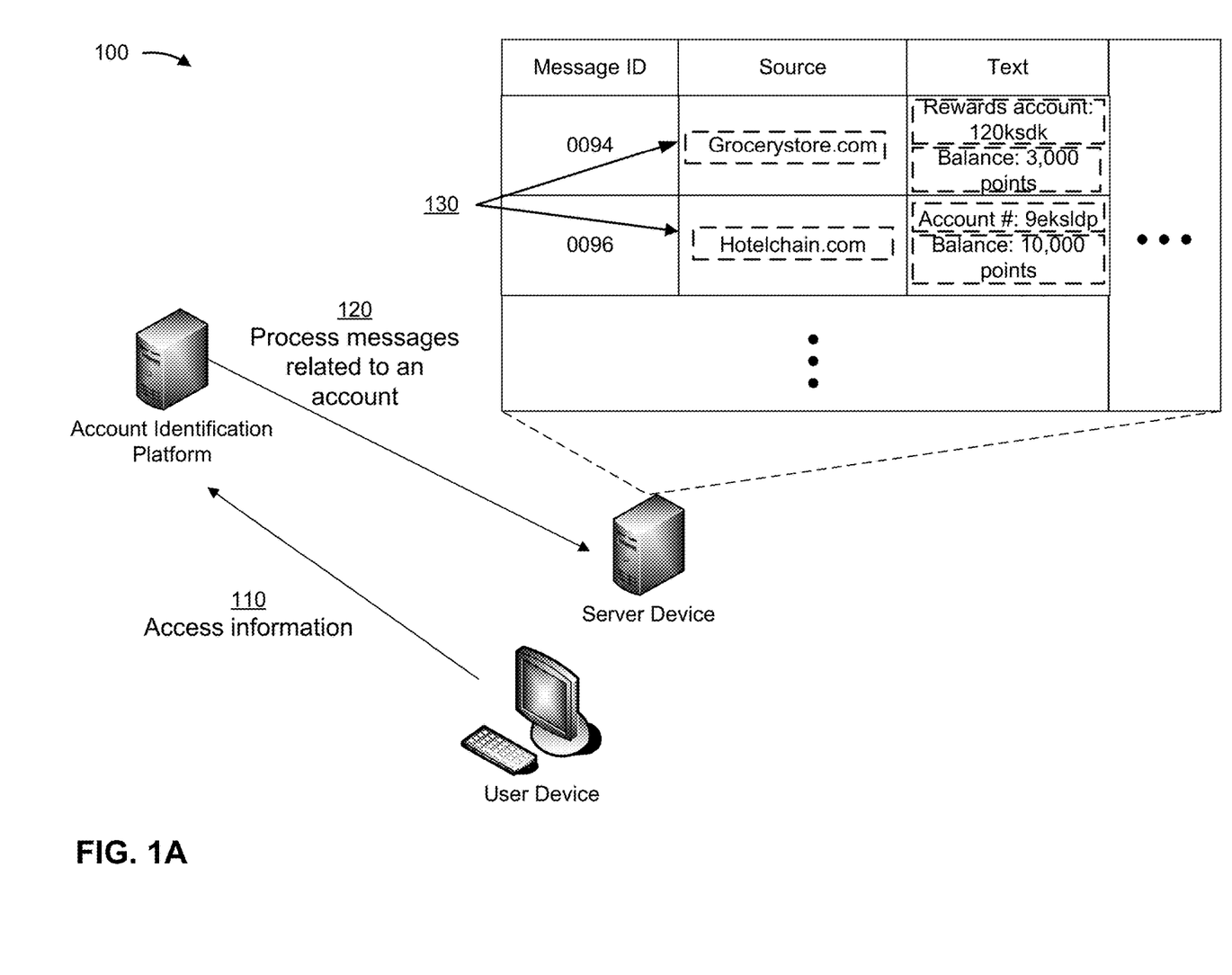
FIGS. 1A and 1B are diagrams of an overview of an example implementation described herein.
Figure 1B:
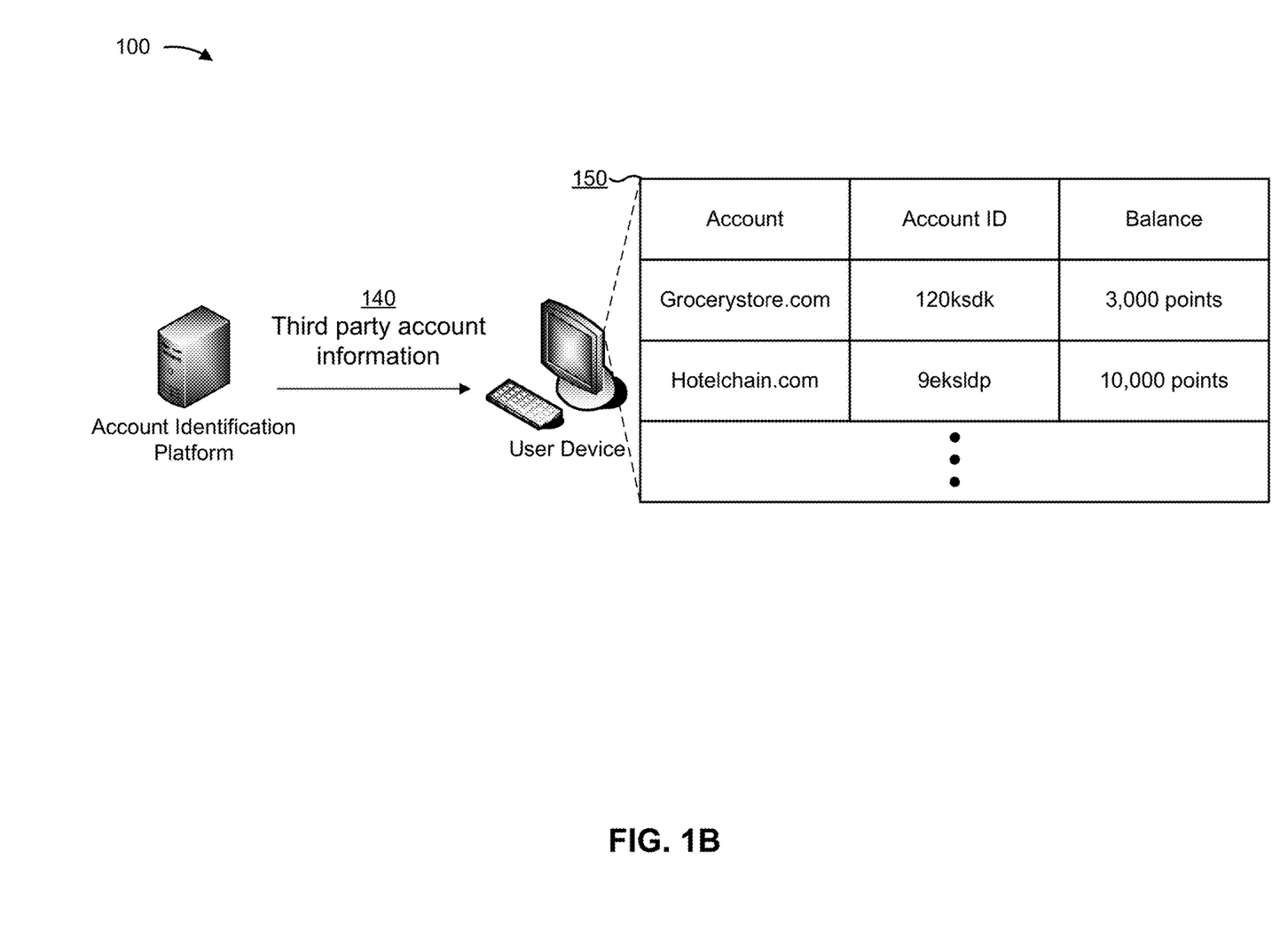

FIGS. 1A and 1B are diagrams of an overview of an example implementation 100 described herein. As shown in FIG. 1A, example implementation 100 may include an account identification platform, a server device, and a user device. As shown by reference number 110, the account identification platform may receive, from the user device, access information that can be used to access an account associated with messages to be processed. For example, the account may be an email account, a text messaging account, an instant messaging account, and/or the like. The access information may include a user name/password combination, a security token (e.g., that provides the account identification platform with limited access to an account), and/or the like.

As shown by reference number 120, the account identification platform may process messages related to an account (e.g., the email account, the text messaging account, the instant messaging account, etc.). For example, the server device may store the messages to be processed by the account identification platform and the account identification platform may communicate with the server device to process the messages. Continuing with the previous example, the account identification platform may process the messages using a natural language processing technique, an image processing technique, an audio processing technique, and/or the like.

The account identification platform may perform multiple sets of processing. For example, the account identification platform may perform a first set of processing to identify one or more messages associated with particular third parties (e.g., a particular retailer, a particular club, etc.) by identifying a source of the message, a domain name related to the message, and/or the like. Continuing with the previous example, the account identification platform may perform a second set of processing to identify a subset of the messages associated with the particular third parties that include terms and/or phrases that indicate that the message is associated with a loyalty program, a rewards program, and/or the like (e.g., by identifying account information for the loyalty program, the rewards program, etc.).

As shown by reference number 130, the account identification platform may, as a result of processing the messages, identify messages from particular sources (e.g., shown as "grocerystore.com" and "hotelchain.com"), that include particular terms and/or phrases (e.g., shown as "rewards account," "account #," "balance," etc.), values that correspond to the identified terms and/or phrases (e.g., shown as "120ksdk," "9eksldp," "3,700," and "10,000"), and/or the like. For example, the information identified in the messages may be associated with one or more third party accounts, such as loyalty accounts, rewards accounts, and/or the like.

As shown in FIG. 1B, and as shown by reference number 140, the account identification platform may provide third party account information to the user device. For example, the account identification platform may provide the third party account information to an electronic wallet associated with the user device. The third party information may include, for example, terms and/or phrases identified in the messages (e.g., an account identifier, a balance of a third party account, etc.). As shown by reference number 150, the user device may store the third party account information in a data structure and/or may provide the third party account information for display. For example, the user device may display third party account information that identifies the third parties associated with the third party accounts identified by the account identification platform (e.g., shown as "grocerystore.com" and "hotelchain.com"), corresponding account identifiers for the third party accounts (e.g., shown as "120ksdk" and "93eksldp"), corresponding balances for the third party accounts (e.g., "3,000 points" and "10,000 points"), and/or the like. The third party account information may be included in an electronic wallet or other application associated with the user device.

In this way, the account identification platform may populate an electronic wallet or other application with third party account information for various third party accounts. This improves use of the third party account information via aggregation of the third party account information. In addition, this conserves processing resources related to locating and using the third party account information by facilitating a quick and easy way for a user of the user device to locate and use the third party account information. Further, this improves storage of third party account information by organizing the third party account information into an electronic wallet or other application, which may include a dedicated application for storing the aggregated third party account information.

As indicated above, FIGS. 1A and 1B are provided merely as an example. Other examples are possible and may differ from what was described with regard to FIGS. 1A and 1B.

Figure 2:
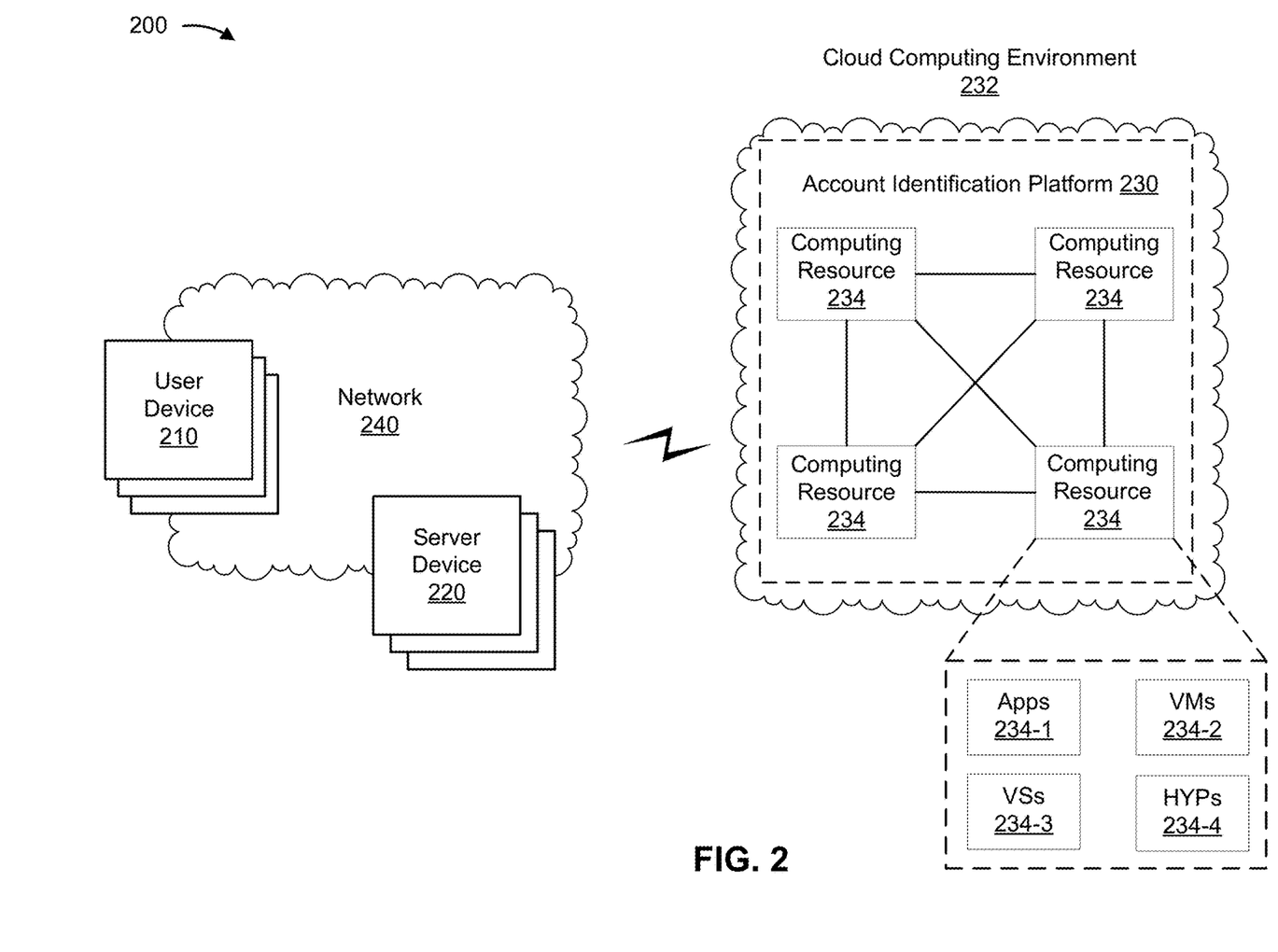
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), a set of server devices 220 (referred to collectively as "server devices 220" and individually as "server device 220"), and account identification platform 230 provided in cloud computing environment 232 that includes a set of computing resources 234. Devices of environment 200 may interconnect via wired connections, wireless connections, or a combination of wired and wireless connections.

User device 210 includes one or more devices capable of receiving, generating, storing, processing, and/or providing information related to identifying an account identified in a message. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to account identification platform 230 access information related to an account of messages associated with a user of user device 210, as described elsewhere herein. Additionally, or alternatively, user device 210 may receive, from account identification platform 230, a result of processing messages to identify third party accounts identified in the messages, as described elsewhere herein.

Server device 220 includes one or more devices capable of receiving, generating, storing, processing, and/or providing information related to identifying an account identified in a message. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may store messages to be processed by account identification platform 230, as described elsewhere herein. Additionally, or alternatively, server device 220 may permit account identification platform 230 to process messages stored by server device 220 (e.g., based on account identification platform 230 providing access information related to an account associated with the messages), as described elsewhere herein.

Account identification platform 230 includes one or more devices capable of receiving, generating, storing, processing, and/or providing information related to identifying an account identified in a message. For example, account identification platform 230 may include a cloud server or a group of cloud servers. In some implementations, account identification platform 230 may be designed to be modular such that certain software components can be swapped in or out depending on a particular need. As such, account identification platform 230 may be easily and/or quickly reconfigured for different uses.

In some implementations, as shown, account identification platform 230 may be hosted in cloud computing environment 232. Notably, while implementations described herein describe account identification platform 230 as being hosted in cloud computing environment 232, in some implementations, account identification platform 230 may not be cloud-based (i.e., may be implemented outside of a cloud computing environment) or may be partially cloud-based.

Cloud computing environment 232 includes an environment that hosts account identification platform 230. Cloud computing environment 232 may provide computation, software, data access, storage, and/or other services that do not require end-user knowledge of a physical location and configuration of a system and/or a device that hosts account identification platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host account identification platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with account identification platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
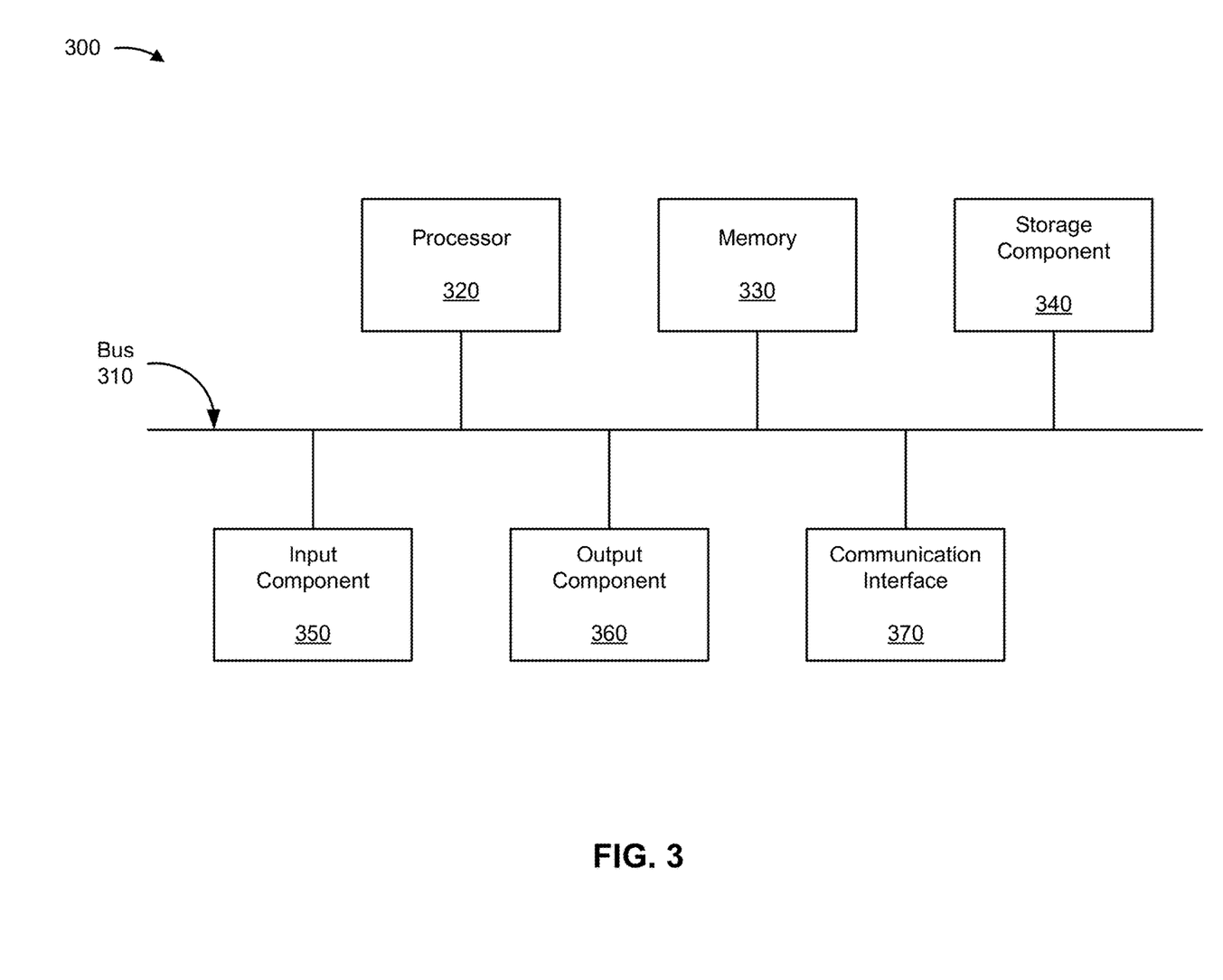
FIG. 3 is a diagram of example components of one or more devices of FIG. 2.

FIG. 3 is a diagram of example components of a device 300. Device 300 may correspond to user device 210, server device 220, account identification platform 230, and/or computing resource 234. In some implementations, user device 210, server device 220, account identification platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
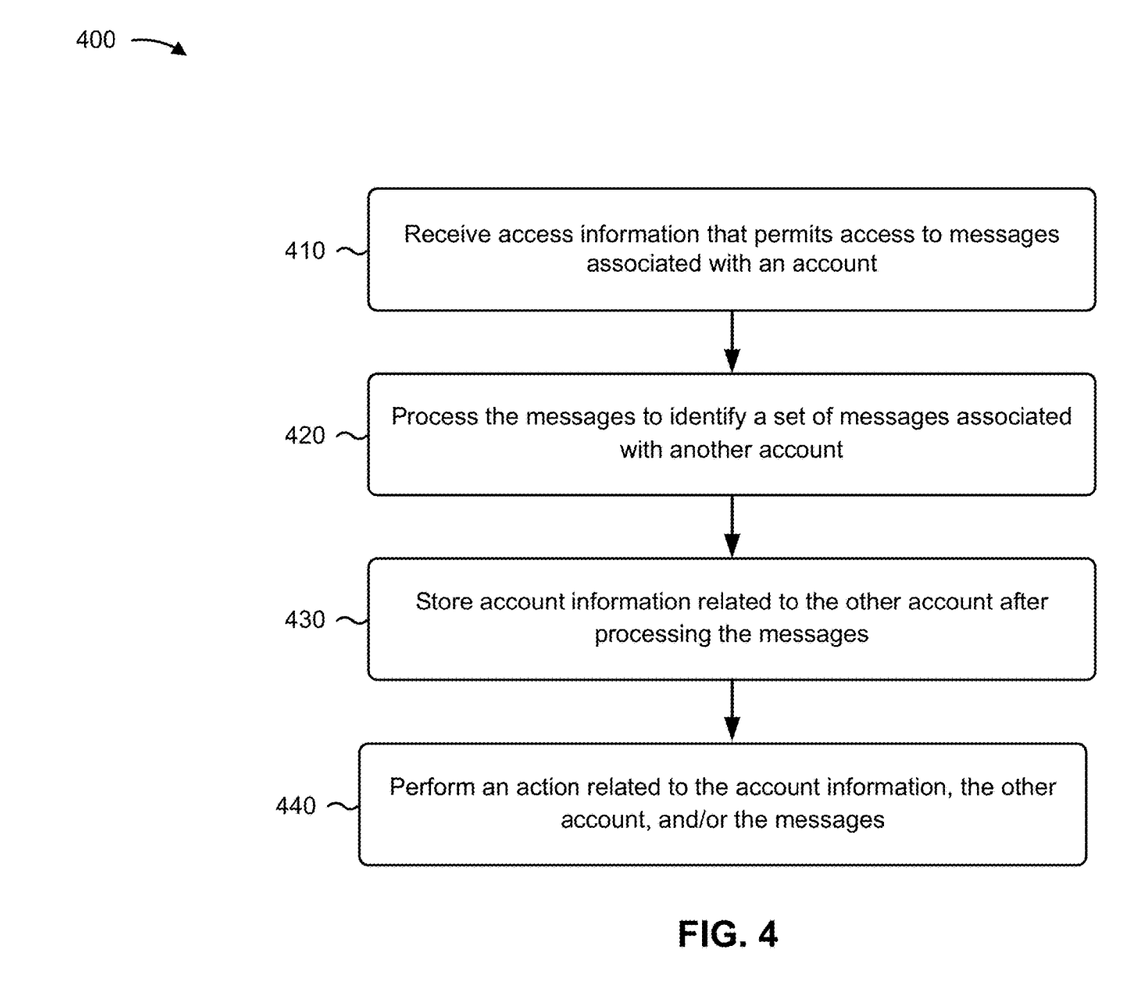
FIG. 4 is a flow chart of an example process for processing messages for attribute-value pair extraction.

FIG. 4 is a flow chart of an example process 400 for processing messages for attribute-value pair extraction. In some implementations, one or more process blocks of FIG. 4 may be performed by account identification platform 230. In some implementations, one or more process blocks of FIG. 4 may be performed by another device or a group of devices separate from or including account identification platform 230, such as user device 210 or server device 220.

As shown in FIG. 4, process 400 may include receiving access information that permits access to messages associated with an account (block 410). For example, account identification platform 230 may receive, from user device 210, access information that permits access to messages associated with an account. In some implementations, account identification platform 230 may receive the access information based on requesting the access information, based on a user of user device 210 inputting the access information (e.g., via a user interface, an application executing on user device 210, etc.), and/or the like.

In some implementations, the access information may include a set of credentials associated with an account, a username/password combination, a security token (e.g., that provides limited access to an account), and/or the like. For example, the access information may permit account identification platform 230 to access messages associated with an account (e.g., for a limited amount of time, stored in a particular folder associated with the account, such as an inbox or a spam folder, etc.).

In some implementations, a message may include an email, a text message, an instant message, a voicemail, a push notification, and/or the like. In some implementations, the account may include an electronic messaging account such as, for example, an email account, an instant messaging account, a text messaging account, a voicemail account, and/or the like. In some implementations, server device 220 may host the account (e.g., may store a message, may store information used to verify access information, etc.).

In some implementations, account identification platform 230 may receive the access information related to accessing the account prior to processing a message associated with the account. In some implementations, account identification platform 230 may access the account by providing, to another device (e.g., server device 220), the access information after receiving the access information.

In this way, account identification platform 230 may receive access information that permits access to messages prior to processing the messages.

As further shown in FIG. 4, process 400 may include processing the messages to identify a set of messages associated with another account (block 420). For example, account identification platform 230 may process the messages to identify a set of messages associated with another account (e.g., a third party account associated with a third party). In some implementations, the other account may be a user account associated with points (e.g., loyalty points, rewards points, etc.) or another value. In some implementations, the other account may be a user account associated with a third party (e.g., different than a party with which the account related to the messages is associated) that provides a membership program, loyalty program, a rewards program, and/or the like with which the other account is associated.

In some implementations, account identification platform 230 may process a message associated with the account to identify an identifier that identifies a third party with which the message is associated. For example, the identifier may include a name of an organization, a name of a loyalty/rewards/membership program, a domain name, and/or the like. In some implementations, account identification platform 230 may analyze metadata or other data associated with the message to identify the identifier.

In some implementations, account identification platform 230 may process multiple messages associated with the account based on receiving the access information. In some implementations, account identification platform 230 may identify, based on processing the multiple messages, particular information in one or more of the multiple messages. For example, the particular information may include domain information (e.g., a domain name) for a third party and/or or information that identifies the third party, such as a name of the third party, a logo of the third party, and/or the like.

In some implementations, account identification platform 230 may process text associated with a message using a text processing technique, such as a natural language processing technique, a text analysis technique, a computational linguistics technique, and/or the like. For example, account identification platform 230 may process text to identify a term, a phrase, a symbol, and/or the like included in a message. Additionally, or alternatively, account identification platform 230 may process audio associated with a message using an audio processing technique, such as a speech-to-text technique, an automatic speech recognition (ASR) technique, a computer speech recognition technique, and/or the like. For example, account identification platform 230 may process audio to identify a term and/or phrase included in the audio. Additionally, or alternatively, account identification platform 230 may process an image associated with a message using an image processing technique, such as a computer vision technique, an optical character recognition (OCR) technique, a feature detection technique, and/or the like. For example, account identification platform 230 may process an image to identify a term, a phrase, a symbol, a logo, and/or the like included in an image in a message.

As a specific example, in some implementations, account identification platform 230 may process a message to identify a domain name that includes an identifier associated with a third party (e.g., a name of the third party, a website of the third party, etc.). Additionally, or alternatively, and as another example, account identification platform 230 may process a message to identify text that includes an identifier associated with a third party. Additionally, or alternatively, and as another example, account identification platform 230 may process a message to identify an image that includes an identifier associated with a third party.

In some implementations, account identification platform 230 may identify the messages associated with the account prior to processing one or more of the messages. For example, account identification platform 230 may identify messages in an inbox of the account, messages that have been archived, and/or the like.

In some implementations, account identification platform 230 may determine that one or more of the messages are to be processed and/or that one or more other messages are not to be processed based on information associated with the one or more messages and/or the one or more other messages. For example, account identification platform 230 may identify messages that have been tagged as private by a user of user device 210 (e.g., indicating that the messages are not to be processed). In some implementations, account identification platform 230 may process only those messages associated with one of a predetermined identifier deemed to be associated with a relevant third party.

Additionally, or alternatively, and as another example, account identification platform 230 may use machine learning to identify messages that are not to be processed (e.g., messages that are not likely to be associated with a third party account, such as a rewards account or a loyalty account). Continuing with the previous example, account identification platform 230 may use machine learning to identify messages that are not to be processed based on terms and/or phrases included in the subjects of the messages (e.g., where the terms and/or phrases indicate that the messages are likely personal messages that a user associated with the account would want to be kept private, are not associated with a loyalty program or a rewards program, etc.), a quantity of messages exchanged in a chain of messages (e.g., where a threshold quantity of messages may indicate that the messages are personal rather than related to a loyalty program or a rewards program), and/or the like.

This improves processing of messages and/or conserves processing resources of account identification platform 230 by reducing a quantity of messages that account identification platform 230 process. Further, using machine learning facilitates processing of structured or unstructured data related to the messages, thereby reducing or eliminating a need for manual review by a human actor. Further, this facilitates processing of hundreds, thousands, millions, or more messages, thereby facilitating processing of a higher quantity of messages and/or in a shorter amount of time than a human actor.

Additionally, or alternatively, and as additional examples, account identification platform 230 may identify messages that are not to be processed based on the messages being from particular sources (e.g., identified in a data structure input by a user of user device 210), a folder into which the messages are organized, a set of rules, and/or the like. In some implementations, account identification platform 230 may process the one or more messages after determining that the one or more messages are to be processed.

In some implementations, account identification platform 230 may identify a match between an identifier included in a message and transaction information related to an individual associated with the account. In some implementations, transaction information may be related to a transaction associated with an individual. For example, transaction information may identify an organization associated with a transaction, a timestamp of a transaction, a value related to a transaction, and/or the like. In some implementations, transaction information may include a set of identifiers that identify a set of third parties related to a set of transactions associated with an individual. In some implementations, a set of identifiers may be included in a data structure and account identification platform 230 may identify a match between an identifier included in a message and an identifier included in the set of identifiers using the data structure. For example, account identification platform 230 may identify a match between an identifier for a third party included in a message and a set of third parties identified in a data structure.

By identifying a match between an identifier associated with a message and an identifier included in transaction information, account identification platform 230 can distinguish between messages that have a higher likelihood of including account information and messages that have a higher likelihood of being spam messages, that have a higher likelihood of being personal messages, and/or the like. This conserves processing resources of account identification platform 230 by reducing or eliminating a need for account identification platform 230 to process all messages associated with an account for account information and/or by facilitating selective processing of messages for account information.

In some implementations, account identification platform 230 may perform a comparison of an identifier, for a third party, included in a message and a set of identifiers, for a set of third parties (e.g., a set of identifiers included in a data structure, associated with a set of transactions, etc.). In some implementations, account identification platform 230 may determine that an identifier included in a message is included in a set of identifiers related to a set of transactions based on a result of performing a comparison (e.g., where the result indicates a match).

In some implementations, account identification platform 230 may tag a message after processing the message. For example, account identification platform 230 may tag a message with another identifier (e.g., based on a match between an identifier included in the message and a set of identifiers included in transaction information). For example, the other identifier may identify the message as being associated with a set of third parties related to a set of transactions associated with an individual (e.g., a set of third parties identified by the set of identifiers). In some implementations, by tagging a message, account identification platform 230 may form a tagged message. For example, a tagged message may be associated with a third party related to a transaction associated with an individual.

In some implementations, account identification platform 230 may tag a message within an account. In some implementations, account identification platform 230 may configure a flag, a label, and/or the like associated with a message to tag a message. Additionally, or alternatively, account identification platform 230 may store information identifying tagged messages (e.g., in server device 220). In some implementations, account identification platform 230 may store, in a data structure, information identifying a message to tag the message. Additionally, or alternatively, server device 220 (e.g., on which messages are stored) may store information identifying tagged messages.

In some implementations, account identification platform 230 may receive, from server device 220 associated with the account, a message based on the message being tagged. For example, account identification platform 230 may receive a tagged message from server device 220 based on the tagged message being tagged with an identifier that identifies the tagged messages as being associated with one or more third parties identified in transaction information. This conserves processing resources and/or memory resources of account identification platform 230 by reducing or eliminating a need for account identification platform 230 to receive all messages associated with an account. In this way, tagging messages functions as an initial filter to receiving a message.

In some implementations, account identification platform 230 may receive a message from server device 220 to store the message. For example, storing the message reduces or eliminates a need for account identification platform 230 to repeatedly communicate with server device 220, thereby conserving processing resources of server device 220, facilitating on-demand display of the message, and/or the like. Additionally, or alternatively, account identification platform 230 may receive a portion of a message (e.g., a body of a message), thereby reducing or eliminating further processing of sensitive information, such as information that identifies a sender of a message.

In some implementations, account identification platform 230 may receive the message based on requesting the message. For example, account identification platform 230 may receive a tagged message based on requesting tagged messages from server device 220, based on sending a request to server device 220 that identifies tagged messages, and/or the like. Additionally, or alternatively, account identification platform 230 may receive the message via an application programing interface (API) associated with an account and/or server device 220 (e.g., based on requesting a message associated with a particular third party, such as a third party identified in transaction information, a message not identified as spam by server device 220, etc.). This reduces or eliminates a need for account identification platform 230 to process messages to identify a message associated with the particular third party, thereby conserving processing resources of account identification platform 230.

In some implementations, account identification platform 230 may request, from another device (e.g., server device 220), a tagged message after tagging one or more messages associated with an account. In some implementations, account identification platform 230 may receive tagged messages prior to identifying a subset of tagged messages that include account information associated with an account related to a third party (e.g., associated with an account related to a loyalty program, a rewards program, etc.). For example, account identification platform 230 may request, via an API, a message configured with a particular flag, a message identified in a data structure associated with account identification platform 230, a message not identified as spam or as a personal message by server device 220, and/or the like.

In some implementations, account identification platform 230 may process a message to identify account information related to the other account associated with a third party. For example, account identification platform 230 may process a tagged message received from server device 220. In some implementations, the account information related to the other account may include an account identifier (e.g., an account number, a username, etc.), a points or value balance related to the other account (e.g., a total quantity of points related to the other account, a quantity of points earned for a transaction, etc.), third party information associated with a third party with which the other account is associated (e.g., a name of the third party, a logo for the third party, etc.), and/or the like. In some implementations, the other account may be an account for a membership program, a loyalty program, a rewards program, and/or the like.

In some implementations, account identification platform 230 may process a message (e.g., a tagged message) to identify account information in a manner similar to that described elsewhere herein. For example, account identification platform 230 may process text, audio, an image and/or the like associated with a tagged message.

In some implementations, account identification platform 230 may identify multiple messages that include account information. In this case, account identification platform 230 may select the most recent message from which to extract the account information. In this way, account identification platform 230 may more accurately identify account information, such as a balance of points or a value related to an account relative to selecting a message that is not the most recent message.

In some implementations, account identification platform 230 may identify a tagged message that includes one or more attribute-value pairs. For example, an attribute-value pair may include a combination of a term and/or phrase and a value (e.g., a combination of the phrase "account number" and an account number, a combination of the phrase "rewards points" and a balance of rewards points, etc.).

In some implementations, account identification platform 230 may store a message that includes account information for the other account. For example, account identification platform 230 may store messages (e.g., tagged messages) that include account information related to a loyalty and/or rewards program associated with a third party identified in transaction information. In some implementations, account identification platform 230 may store a message, or information identifying the message, in a data structure. For example, account identification platform 230 may store a message that includes a particular attribute-value pair.

In this way, account identification platform 230 may process the messages to identify account information prior to storing the account information.

As further shown in FIG. 4, process 400 may include storing account information related to the other account after processing the messages (block 430). For example, account identification platform 230 may store account information related to the other account after processing the messages. In some implementations, account identification platform 230 may store the account information in memory resources of account identification platform 230, in a data structure, and/or the like.

In some implementations, account identification platform 230 may extract the account information from a message after processing the message to identify the account information (e.g., may copy the account information from the message). For example, account identification platform 230 may store the account information after extracting the account information from the message. In some implementations, account identification platform 230 may encrypt the account information after extracting the account information. Additionally, or alternatively, account identification platform 230 may delete the message after encrypting the account information. Additionally, or alternatively, account identification platform 230 may delete other messages that do not contain account information (e.g., other tagged messages received from server device 220 that do not contain account information).

In some implementations, account identification platform 230 may communicate with server device 220 to confirm account information extracted from a message. For example, account identification platform 230 may provide extracted account information to server device 220 to confirm the extracted account information. This reduces or eliminates storing of inaccurate account information by account identification platform 230. In addition, this improves an accuracy of extracted account information relative to not confirming the account information.

In this way, account identification platform 230 may store account information related to the other account after processing the messages.

As further shown in FIG. 4, process 400 may include performing an action related to the account information, the other account, and/or the messages (block 440). For example, account identification platform 230 may perform an action related to the account information, the other account, and/or the messages.

In some implementations, account identification platform 230 may perform an action related to the account information, the other account, and/or the message after extracting the account information from the message. Additionally, or alternatively, account identification platform 230 may perform an action related to the account information, the other account, and/or the message after storing the account information.

In some implementations, account identification platform 230 may receive a request (e.g., from user device 210) for account information related to the other account associated with a third party. For example, a user may request, via a user interface associated with an application executing on user device 210, account information related to the other account. In some implementations, account identification platform 230 may perform, based on the request, an action to provide, for display via user device 210, the account information related to the other account. Additionally, or alternatively, account identification platform 230 may automatically perform (e.g., periodically, based on a trigger, etc.) an action to provide, for display via user device 210, the account information related to the other account. In some implementations, account identification platform 230 may provide the account information for display to facilitate use of the account information when completing a transaction.

In some implementations, the account information related to the other account may include an attribute-value pair. For example, the account information may include an account identifier for the other account and/or text indicating that the account identifier is associated with the other account (e.g., the text "account number" and a corresponding account number for the other account).

In some implementations, account identification platform 230 may identify the account information based on location information associated with user device 210 that is associated with the other account. In this case, account identification platform 230 may provide, for display via user device 210, account information for the other account that is associated with the location of user device 210. In some implementations, account identification platform 230 may receive location information that identifies a location of a user device 210 that is associated with an individual. In this case, account identification platform 230 may determine the location of user device 210 associated with the individual based on the location information. In some implementations, account identification platform 230 may provide a notification, to user device 210 for display, that identifies the other account.

In this case, the other account may be associated with the location, and the notification may include the account information, may identify that the other account is associated with the location, and/or the like. For example, as a user of user device 210 drives near a hotel, user device 210 may provide, for display, account information for the hotel.

In some implementations, account identification platform 230 may perform an action to generate, in an electronic wallet associated with user device 210, a virtual transaction card for the other account. For example, the virtual transaction card may be associated with the other account.

In some implementations, account identification platform 230 may receive, from user device 210 that is associated with an individual, information that indicates that the individual has accessed an application, executing on user device 210, related to a third party. In this case, account identification platform 230 may perform an action to provide, to the application, account information for an account associated with the third party after receiving the information that indicates that the individual has accessed the application. Additionally, or alternatively, account identification platform 230 may receive information that indicates that user device 210 that is associated with an individual is accessing a website associated with a third party. In this case, account identification platform 230 may provide account information for an account associated with the third party to user device 210 for display.

In some implementations, account identification platform 230 may perform an action to update the other account based on the account information. For example, account identification platform 230 may update a record to reflect rewards points received for a transaction (e.g., to claim rewards points). Continuing with the previous example, account identification platform 230 may provide a message to server device 220 that stores account information for the other account to update the account information with the received rewards points.

In some implementations, user device 210 may detect that a user of user device 210 is communicating with another user of another user device 210 regarding a vacation (e.g., based on text, audio, and/or the like of messages exchanged between user device 210 and the other user device 210). In some implementations, user device 210 may provide, for display, account information from an electronic wallet based on the content of the messages exchanged between user device 210 and the other user device 210. For example, user device 210 may provide account information for a hotel loyalty/rewards program, for a rental car loyalty/rewards program, and/or the like.

Additionally, or alternatively, user device 210 may detect that a user of user device 210 has accessed a webpage of a third party, and may automatically provide, for display, account information for the third party. For example, if a user of user device 210 has accessed a website for a travel fare aggregator, user device 210 may provide for display account information related to an airline, a hotel chain, a rental car company, and/or the like.

Additionally, or alternatively, user device 210 may provide notifications for display that are sorted based on one or more factors (e.g., a preference of a user of user device 210, a quantity of points associated with an account, etc.). For example, user device 210 may detect that user device 210 is at a location that is a threshold proximity from one or more hotels, and user device 210 may provide, for display, notifications related to account information for the one or more hotels (e.g., where the account information with the most points is listed first).

In this way, account identification platform 230 may perform an action related to the account information, the other account, and/or the messages.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
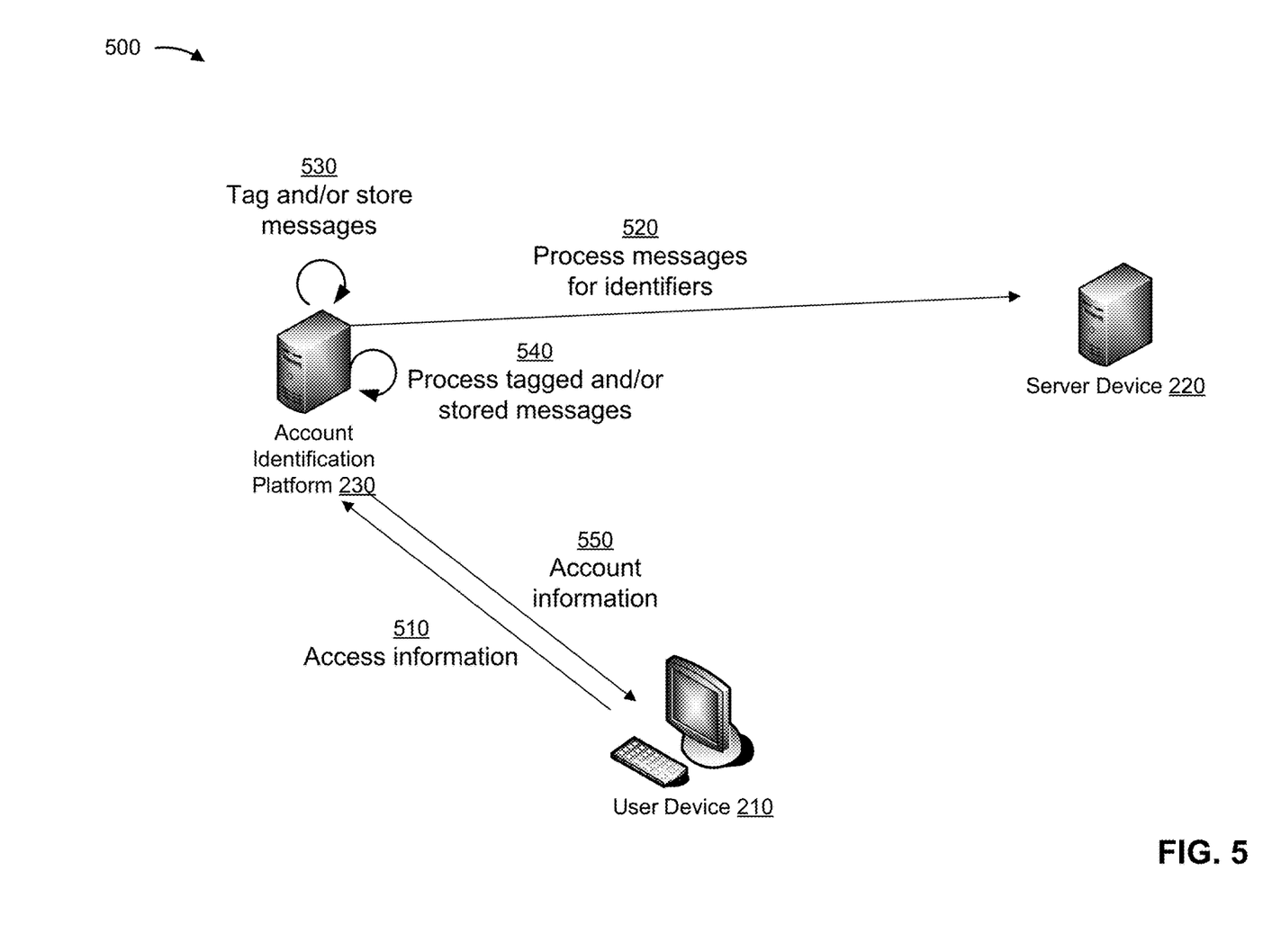
FIG. 5 is a diagram of an example implementation relating to the example process shown in FIG. 4.

FIG. 5 is a diagram of an example implementation 500 related to example process 400 shown in FIG. 4. As shown in FIG. 5, example implementation 500 may include account identification platform 230, server device 220, and user device 210. Example implementation 500 is an example of identifying particular messages that include account information. As shown by reference number 510, account identification platform 230 may receive access information from user device 210. As shown by reference number 520, account identification platform 230 may process messages for identifiers that identify third parties associated with the messages. For example, account identification platform 230 may process the messages in a manner similar to that described elsewhere herein.

As further shown in FIG. 5, and as shown by reference number 530, account identification platform 230 may tag and/or store messages that are associated with particular third parties (e.g., that include identifiers that identify the third parties). In this way, account identification platform 230 may identify the messages as being associated with particular third parties. As shown by reference number 540, account identification platform 230 may process tagged and/or stored messages for account information associated with accounts related to the third parties. For example, account identification platform 230 may process the tagged and/or stored messages for particular terms and/or phrases that identify accounts, balances for accounts, and/or the like. As shown by reference number 550, account identification platform 230 may provide the account information to user device 210 for display (e.g., via an application, an electronic wallet, etc.).

As indicated above, FIG. 5 is provided merely as an example. Other examples are possible and may differ from what was described with regard to FIG. 5.

Figure 6:
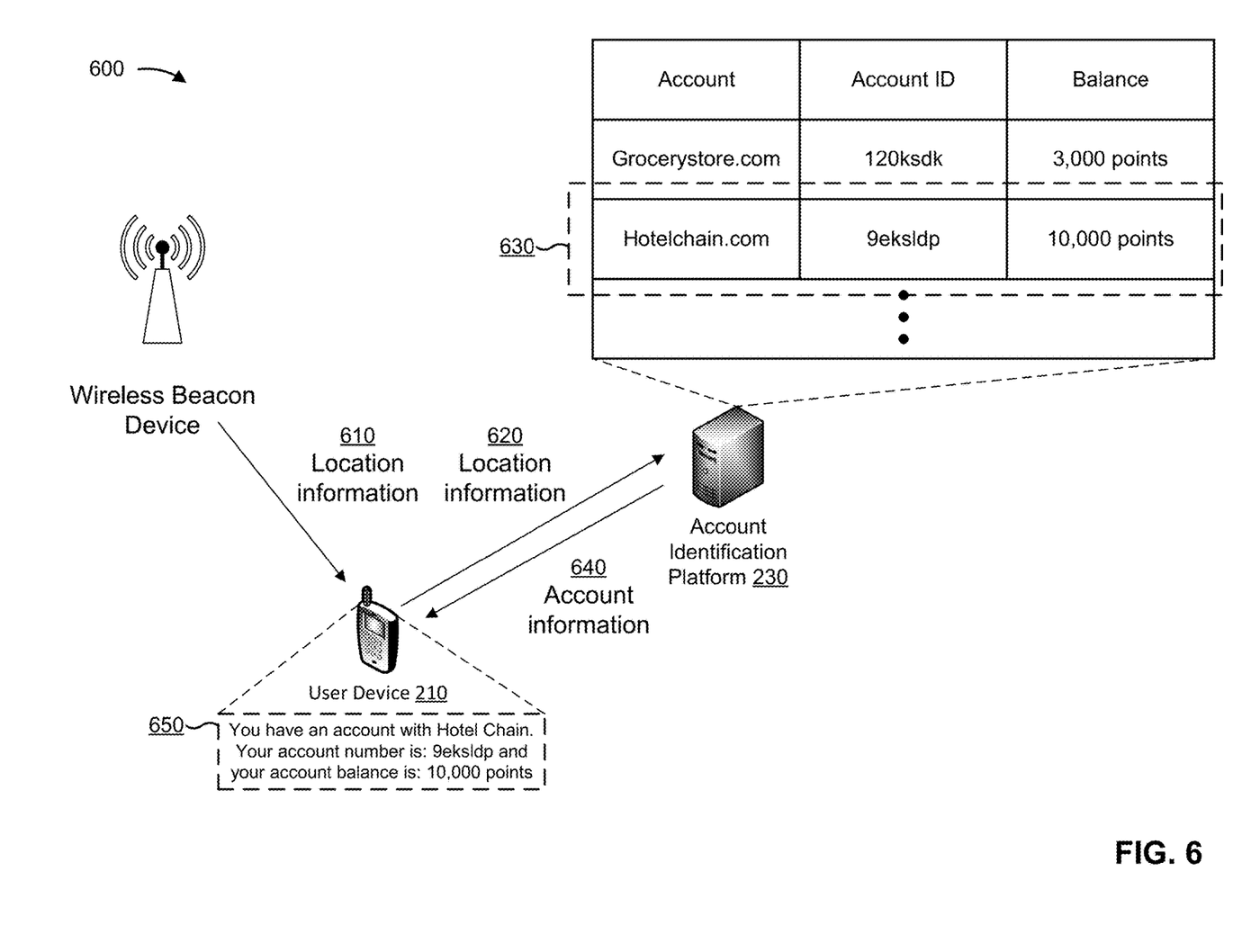
FIG. 6 is a diagram of an example implementation relating to the example process shown in FIG. 4.

FIG. 6 is a diagram of an example implementation 600 related to example process 400 shown in FIG. 4. As shown in FIG. 6, example implementation 600 may include account identification platform 230, user device 210, and a wireless beacon device. In some implementations, the wireless beacon device may be deployed at a particular location, such as a retail location, a geographic location, and/or the like. Alternatively, instead of a wireless beacon device, example implementation 600 may include a smart poster, a quick response (QR) code affixed to a poster or a sign, and/or the like.

As further shown in FIG. 6, and as shown by reference number 610, the wireless beacon device may provide location information to user device 210 when user device 210 is in communicative proximity to the wireless beacon device. For example, the location information may identify a location of the wireless beacon device, such as a set of coordinates, a geographic location, a brick-and-mortar location for an organization, and/or the like. As shown by reference number 620, user device 210 may provide the location information to account identification platform 230. As shown by reference number 630, account identification platform 230 may identify account information based on the location of user device 210. For example, if the location information indicates that user device 210 is at the location of a particular hotel chain (or within a particular distance of the particular hotel chain), then account identification platform 230 may identify account information for an account associated with the particular hotel chain.

As shown by reference number 640, account identification platform 230 may provide the account information to user device 210 for display (e.g., via an electronic wallet associated with user device 210). Additionally, or alternatively, account identification platform 230 may provide a push notification informing a user of user device 210 that the user has an account for a third party (e.g., for the particular hotel chain) and requesting an indication by the user as to whether the user wants to access and/or utilize the account information associated with the account. As shown by reference number 650, user device 210 may display the notification via a display of user device 210.

As indicated above, FIG. 6 is provided merely as an example. Other examples are possible and may differ from what was described with regard to FIG. 6.

In this way, account identification platform 230 may extract account information from messages and may populate an electronic wallet with the account information. This facilitates aggregation of account information in a manner not possible by a human actor. In addition, this reduces or eliminates a need for a user of user device 210 to search through messages for the account information, thereby conserving processing resources of user device 210, improving use of the account information, and/or the like. Further, this improves a speed at which the account information can be retrieved, thereby improving an efficiency of using the account information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a communication interface; and
one or more processors to:
process a message, associated with a first account, to identify a set of messages associated with a second account,
where unstructured data and structured data associated with the set of messages are processed with a machine learning technique based on at least one of:
terms,
phrases, or
a quantity of messages exchanged in a chain of messages;
store, based on processing the message, account information related to the second account;
determine, based on location information associated with a second device, that the second device is in communicative proximity for wireless communication to a third device;
identify, based on determining that the second device is in communicative proximity for wireless communication to the third device, the account information,
the second account being associated with the third device; and
automatically transmit, to the second device and based on a trigger, the account information,
the trigger being actuated based on determining that the second device is in communicative proximity for wireless communication to the third device.

2. The first device of claim 1, where the location information identifies a location of the third device.

3. The first device of claim 1, where the one or more processors, when providing the account information, are to:
provide a push notification to the second device.

4. The first device of claim 3, where the push notification includes a request for at least one of accessing or utilizing the account information.

5. The first device of claim 1, where the one or more processors, when providing the account information, are to:
provide the account information via an electronic wallet associated with the second device.

6. The first device of claim 1, where the one or more processors are further to:
perform an action to generate, in an electronic wallet associated with the second device, a virtual transaction card for the second account.

7. The first device of claim 1, where the one or more processors are further to:
receive, from the second device, an indication that an application has been accessed; and
where the one or more processors, when providing the account information, are to:
provide the account information based on receiving the indication.

8. A method, comprising:
processing, by a first device, a message, associated with a first account, to identify a set of messages associated with a second account,
where unstructured data and structured data associated with the set of messages are processed with a machine learning technique based on at least one of:
terms,
phrases, or
a quantity of messages exchanged in a chain of messages;
storing, by the first device and based on processing the message, account information related to the second account;
determining, by the first device and based on location information associated with a second device, that the second device is in communicative proximity for wireless communication to a third device;
identifying, by the first device and based on determining that the second device is in communicative proximity for wireless communication to the third device, the account information,
the second account being associated with the third device; and
providing, by the first device to the second device and based on determining that the second device is in communicative proximity for wireless communication to the third device, the account information.

9. The method of claim 8, further comprising:
receiving access information that permits access to the message; and
where processing the message comprises:
processing, based on receiving the access information, the message.

10. The method of claim 9, where the access information includes a set of credentials associated with the first account.

11. The method of claim 8, where the first account is associated with a first party different from a second party associated with the second account.

12. The method of claim 8, where processing the message comprises utilizing at least one of:
a natural language processing technique,
a text analysis technique, or
a computation linguistics technique.

13. The method of claim 8, where processing the message comprises at least one of:
identifying a domain name includes an identifier,
identifying a text that includes an identifier, or
identifying an image that includes an identifier.

14. The method of claim 8, where the location information identifies a location of the second device and a location of the third device.

15. A non-transitory computer-readable medium storing instructions, the instructions comprising:
one or more instructions that, when executed by one or more processors of a first device, cause the one or more processors to:
process a message, associated with a first account, to identify a set of messages associated with a second account,
where unstructured data and structured data associated with the set of messages are processed with a machine learning technique based on at least one of:
terms,
phrases, or
a quantity of messages exchanged in a chain of messages;
store, based on processing the message, account information related to the second account;
determine, based on location information associated with a second device, that the second device is in communicative proximity for wireless communication to a third device;
identify, based on determining that the second device is in communicative proximity for wireless communication to the third device, the account information, the second account being associated with the third device; and provide, to the second device and based on determining that the second device is in communicative proximity for wireless communication to the third device, the account information.

16. The non-transitory computer-readable medium of claim 15, where the one or more instructions, that cause the one or more processors to provide the account information, cause the one or more processors to:

provide the account information via an electronic wallet associated with the second device.

17. The non-transitory computer-readable medium of claim 15, where the one or more instructions, when executed by the one or more processors, further cause the one or more processors to:

perform an action to generate, in an electronic wallet associated with the second device, a virtual transaction card for the second account.

18. The non-transitory computer-readable medium of claim 15, where the one or more instructions, when executed by the one or more processors, further cause the one or more processors to:

receive, from the second device, an indication that an application has been accessed; and where the one or more instructions, that cause the one or more processors to provide the account information, cause the one or more processors to:

provide the account information based on receiving the indication.

19. The non-transitory computer-readable medium of claim 15, where the location information identifies a location of the second device and a location of the third device.

20. The non-transitory computer-readable medium of claim 15, where the one or more instructions, when executed by the one or more processors, further cause the one or more processors to:

receiving access information that permits access to the message; and where the one or more instructions, that cause the one or more processors to process the message, cause the one or more processors to:

process, based on receiving the access information, the message.

* * * * *